United States Patent Office 3,459,698
Patented Aug. 5, 1969

3,459,698
ETHYLENE - N - METHYLOL ACRYLAMIDE-ACRYLIC ESTER TERPOLYMERS AS BONDING AGENTS FOR NONWOVEN FABRICS
Gerald J. Mantell and Arthur F. Helin, Kansas City, Mo., and Adolf A. Wutz, Overland Park, Kans., assignors to Gulf Oil Corporation, Pittsburgh, Pa., a corporation of Pennsylvania
No Drawing. Filed Jan. 10, 1966, Ser. No. 519,443
Int. Cl. C08f 15/40; C08g 37/32
U.S. Cl. 260—29.4
36 Claims

ABSTRACT OF THE DISCLOSURE

Bonded nonwoven articles are prepared by applying aqueous dispersions of ethylene-N-methylol acrylamide-acrylic acid polymers as a bonding agents to fibrous materials.

---

This invention relates to novel copolymers, and more particularly to novel N-methylolamide containing copolymers.

Methods for the preparation of bonded fibrous products are well known. These bonded fibrous products have acquired an important position in the industry, and they are useful in the production of articles of either flat or three-dimensional shape, including fabrics, insulating material and in the binding of cotton linters for use as padding in automotive seatings and in upholstery.

Although bonded fibrous products are conventionally prepared by various methods, a typical method would comprise first consolidating a mass of randomly arrayed or randomly distributed fibers into the desired shape, either flat or three dimensional. The consolidated mass is then impregnated with a binder agent with subsequent curing into the final bonded article. Polymeric material are used to a great extent as binders for bonding the fibers in nonwoven structures. These polymeric materials are generally cross-linkable or curable resins, as for example polyvinyl acetate, polyacrylic acid esters, polyvinyl chloride and polymers of N-methylolacrylamide, or mixtures thereof. Aminoplasts, such as condensates of formaldehyde with urea or melamine have also been employed as binders for non-woven structures. However, the fibrous products bonded with these binding agents vary considerably as regards stability and resistance to laundering with detergents and organic solvents as for example those employed in dry cleaning. In general, the known binding agents heretofore employed have not been entirely satisfactory.

In accordance with this invention, a novel class of N-methylolamide containing copolymers have been discovered which are capable of bonding fibers into a nonwoven fibrous product having good stability and resistance to laundering and dry cleaning with solvents adequate for most practical purposes.

These novel copolymers of this invention are copolymers of (A) ethylene, (B) an N-methylolamide of either acrylic acid or methacrylic acid, and (C) a alkyl ester of either acrylic acid or methacrylic acid with the alkyl ester moiety thereof containing from 1 to 12 carbon atoms, and preferably 1 to 6 carbon atoms (said copolymers hereinafter referred to for convenience as ethylene/N-methylolamide/ester copolymers). The distribution of the monomers may vary in the polymer chain, but in general the copolymer will contain recurring units having the structures (A) 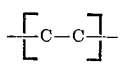

(B) 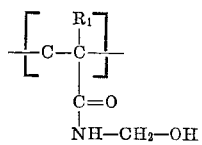

(C) 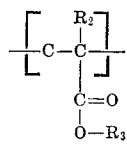

where $R_1$ and $R_2$ are members of the class of hydrogen and the methyl radical, and $R_3$ is a member of the class of alkyl radicals containing 1 to 12 carbon atoms.

Hereinafter for purposes of convenience and for this application, the above monomeric unit "B" will be referred to as the "N-methylolamide monomer" and the above monomer unit "C" will be referred to as the "ester monomer."

Where the ethylene/N-methylolamide/ester copolymers are to be used as binding agents for bonding fibers into nonwoven products, the copolymers will normally comprise, by weight, from 20 to 80% of ethylene, 0.5 to 5% of the N-methylolamide monomer, and 20 to 75% of the ester monomer. Preferably, for such use, the copolymers will comprise, by weight, 30 to 55% ethylene, 1 to 4% of the N-methylolamide monomer and 40 to 60% of the ester monomer; and a particularly effective copolymer for such use would comprise, by weight, 48% ethylene, 2% of the N-methylolamide monomer, and 50% of the ester monomer.

The lower alkyl esters useful in this invention are those of acrylic acid (i.e. where $R_2$ of the above monomer unit C is hydrogen) and of methacrylic acid (where $R_2$ of the above monomer C is the methyl radical, and wherein the alkyl ester group (i.e., $R_3$ of the above monomer unit C) is a straight or branched aliphatic carbon group having from 1 to 12 carbon atoms, and hydroxy derivatives thereof. The esters include methyl acrylate, ethyl acrylate, propyl acrylate, isopropyl acrylate, n-butyl acrylate, t-butyl acrylate, amyl acrylate, hexyl acrylate, methyl methacrylate, ethyl methacrylate, propyl methacrylate, butyl methacrylate, t-butyl methacrylate, amyl methacrylate, 2-hydroxyethyl methacrylate, hexyl methacrylate, 2-ethylhexyl acrylate and 2-ethylhexyl methacrylate. The preferred ester groups will contain from 1 to 4 carbon atoms, with methyl methacrylate and n-butyl acrylate being particularly useful where the novel copolymers are used as binding agents, where the ester monomer will normally be used in the range of about 30 to about 75% and preferably from about 40 to 50% by weight, based on the total weight of the monomers.

The N-methylolamide monomers comprehended in this invention include both N-methylol acrylamide and N-methylol methacrylamide. For use as binding agents the N-methylol amides will normally be used in the range of 0.5 to 5 wt. percent and preferably from 1 to 4 wt. percent based on the weight of copolymer.

The novel copolymers can be prepared by a variety of methods. In one method the copolymers can be obtained by first copolymerizing a reaction mixture, comprised of (A) ethylene, (B) the above-described lower alkyl ester, and (C) the amide of acrylic or methacrylic acid, to initially obtain the corresponding amide-containing copolymer of the monomers which can be employed as an intermediate copolymer for conversion to the novel N-methylolamide-containing copolymer. This amide-containing intermediate copolymer is then reacted with formaldehyde to convert amide groups of the intermediate copolymer to N-methylolamide groups. This reaction with formaldehyde proceeds very readily at moderate temperatures 25 to 50° C., and if desired may be carried out in the presence of a mild catalyst such as KOH, NaOH, $Na_2CO_3$ and the like. However, it is essential that the methylolation be carried out at a temperature not greater than about 45° C. and a pH above about 8.5, since the desired formaldehyde modified reaction product will not be obtained if these conditions are not observed. If the temperature is allowed to rise above 45° C., the deamidation of the intermediate copolymer results with the formation of odoriferous primary, secondary and tertiary amines. If the pH is too low, a cross-linking reaction proceeds simultaneously with the methylolation, which defeats the purpose of the methylolation. Accordingly, it is essential that in all events involving the reaction of formaldehyde and the amide, the reaction be effected in an alkaline medium and at temperatures not exceeding about 45° C. The formaldehyde is conveniently employed as 37% solution in water, i.e., Formalin.

The formaldehyde reaction with the amide-containing intermediate copolymer is normally effected with a substantial excess of the amount of formaldehyde necessary to form methylolamide groups in the polymer chain. Where complete methylolation of the amide groups is desired, the excess may be three-fold and preferably a five-fold equivalent of formaldehyde for each amide group in the polymer chain. Conversely, where complete methylolation is not desired, this ratio may be lowered to as low as about 0.2 equivalent of formaldehyde per each amide group in the intermediate copolymer.

The two-stage process involving a first preparation of the intermediate copolymer and its subsequent modification with formaldehyde can be simplified into a one-step process by simply adding formaldehyde to the polymerization mix of the monomers whereby the desired N-methylolamide containing copolymer is directly obtained at the end of the polymerization reaction.

In another method, the desired N-methylolamide-containing copolymers can also be obtained by first reacting acrylamide or methacrylamide with formaldehyde to obtain the N-methylolamide derivative then copolymerizing the latter with ethylene and the ester monomers as defined above. The polymerization with the N-methylolamide derivative will normally be carried out in the same manner as when the amide monomer is copolymerized with the ethylene and ester monomers.

In general, in carrying out the polymerization reaction is a free radical type polymerization initiator is ordinarily employed. Useful initiators for this purpose include peroxides, peracids and the so-called persalts including hydrogen peroxide, and the various water-soluble perchlorates, persulfates, percarbonates, perborates, perphosphates, etc., e.g., the ammonium and alkali metal (sodium, potassium, lithium, etc.) salts of percarbonic, peracetic, perboric, perphosphoric, persulfuric, perchloric, etc. acids. Other free-radical type initiators which can be used include $\alpha,\alpha^1$-azodiisobutyronitrile, benzoyl peroxide, t-butyl peroxide, and the like.

The polymerization can be effected by conventional bulk polymerization or in solution or in the presence of an aqueous medium to provide the desired copolymer in dispersed form. The polymerization of the monomers can be effected by a continuous process as well as by a batch operation.

A particularly convenient method of preparing the intermediate ethylene/ester/amide intermediate copolymers is by emulsion polymerization of the monomers since it provides a medium for direct use in the many applications of the final copolymer. These aqueous dispersion can be prepared by co-reacting the monomers in an aqueous reaction medium containing an initiator and an emulsifier at a temperature of about 50 to about 100° C. at pressures of about 1000 to about 6000 p.s.i. Preferably the temperatures will be about 70 to 90° C., and the preferred pressure at about 2000 to about 5000 p.s.i.

The emulsifying agent can be either anionic, cationic or non-ionic. Such emulsifying agents are well known and may be employed for use in the polymerization. Among such emulsifying agents are sodium lauryl sulfate, sodium dodecyl benzene sulfonate, sodium dioctyl sulfosuccinate, polyethoxylated nonyl phenols, polyethoxylated fatty alcohols, polyethoxylated sorbitol esters, alkyl trimethyl ammonium chloride, benzyl trimethylammonium chloride, salts of fatty acids, and the like. The proportion of the emulsifier may be from about 0.5 to about 5.0% based on the total weight of the aqueous medium.

Particularly convenient initiators for use in the emulsion polymerization are those initiators which are water soluble as, for example, water-soluble alkali metal persulfates, such as sodium persulphate and potassium persulfate. The amount of initiator can vary; but in general for purposes of efficiency, the proportion of the initiator will be from about 0.1 to about 0.5% based on the weight of the aqueous medium.

In a typical method of polymerization, distilled water, the emulsifier, initiator and the comonomers (e.g., the ester and the amide, as defined above) are added to a suitably stirred pressure vessel and the contents heated to polymerization until the polymerization is completed. The vessel is then charged with ethylene to the required pressure, and finally the initiator is introduced. The system is maintained at polymerization pressures and temperatures during the course of the polymerization. At the end of the polymerization, an aqueous emulsion of the copolymer is obtained which provides a convenient vehicle for subsequent modification with formaldehyde.

Generally to obtain the desired optimal copolymer having the proportion of monomer units desired for binding of non-woven fabric, the aqueous reaction medium may be prepared to contain, per 100 parts of the aqueous medium, from about 5 to about 15 parts and preferably about 8 to about 12 parts of ester, and about 0.1 to about 2.0 parts and preferably about 0.5 to about 1.0 part of the amide.

The emulsion polymerization technique also provides a convenient means for directly obtaining the desired ethylene/ester/N-methylolamide copolymer. Where it is desired to directly obtain this N-methylolamide copolymer, it is only necessary to add formaldehyde to the polymerization mix. In such an event, in order to obtain the above indicated optimal copolymers for binding of non-woven fabrics, the aqueous reaction medium (for the emulsion polymerization) will contain, per 100 parts aqueous medium, 5 to 15 parts and preferably 8 to 12 parts of the ester monomer, 0.1 to 2.0 parts and preferably 0.5 to 1.0 part of the amide monomer, and .05 to 5 parts and preferably 0.25 to 1.0 part of the formaldehyde. In general, as indicated above where complete conversion of the amide groups to the N-methylolamide groups is desired, the formaldehyde may be added in amounts in excess of that required for the desired reaction with the amide groups. It is only necessary that the reaction medium be maintained at a pH above about 8.5 (normally with suitable pH adjusters, such as $K_3PO_4$, KOH, and NaOH), and the temperature of the polymerization be not allowed to exceed about 100° C.

Alternatively, the emulsion polymerization of the deseried N-methylolamide copolymer can be obtained by the direct addition of the N-methlolamide of acrylic or methacrylic acid as the monomer to the aqueous reaction medium. Although this N-methylolamide monomer is commercially available, it can also be obtained by the reaction of an amide of acrylic or methacrylic acid with formaldehyde, and such reaction proceeds very readily, as for example, at temperatures of above 25.

Various fibers either natural or synthetic can be bonded with the novel copolymers of this invention, with the selection of fiber merely depending upon end use intended for the bonded fibrous product. Among the fibers that can be used are natural fibers, such as jute, sisal, hemp, cotton, cotton linters, silk, mohair, cashmere, and wool. Typical synthetic fibers, which can be bonded in accordance with this invention, include rayon, cellulose esters, polyamides, polyvinyl chloride, polyacrylonitrile and copolymers thereof, polyethylene, polypropylene, and the like. In addition, suitable fibrous materials also include mineral fibers of asbestos, glass, rock wool, and the like.

In one method for the preparation of bonded articles the loose fibers are generally first consolidated into a mass having the structural configuration of the desired article, followed by the dispersion of the copolymers of this invention within the consolidated mass, and thereafter heating the impregnated mass to a temperature sufficient to coalesce and fuse the polymer, and, optionally, heating to temperatures sufficiently high to effect cross-linking of the polymer.

The dispersions of the binder agents of the invention may be applied to the fibers of the consolidated mass by coating the surface thereof or by submersion of the mass in the liquid, thickened or foamed dispersion, so that the binder penetrates into the interior of the consolidated fibrous mass.

Generally, the proportion of the copolymer binders to the weight of the fiber component of the fibrous products can vary widely, depending on the characteristics desired in the final product. Normally, however, the proportion of the copolymer binder that is applied to the fiber components is generally about 2 to about 60% and preferably about 10 to about 40% by weight of the copolymer based on the weight of the fibers.

As noted above, the novel copolymer binders of this invention can be applied to the fibers of the consolidated mass by any means known in the art. For example, where the consolidated mass by any means known in the art. For example, where the consolidated mass of non-woven fibers is a fabric in the form of a fleece or web, the copolymers of this invention may be applied as an aqueous dispersion, where in a typical application the fabric may be impregnated with the copolymer binding agent by dipping or immersing the fabric in the dispersion to provide sufficient wet pick-up of the copolymer. The wetted-out material may then be passed between the nip of a pair of pressure rolls to effect substantially uniform impregnation, and otherwise for controlling the amount and application of the dispersion. Generally such dispersions can contain as little as 1% and as much as 60% of the copolymer binder on a weight basis. Normally, however, such dispersion will contain about 5 to about 50% and preferably about 10 to about 40% copolymer binder content at which it is readily applied by means of dipping, spraying, and the like.

The wet and impregnated non-woven fabric may then be dried and cured by conventional means known to the art. Ordinarily, the impregnated fabric may be dried at temperatures sufficiently high to remove all or a portion of the water and to effect coalescence and fusion of the copolymer within the fabric. For some applications, the dried non-woven fabric may be directly used without further treatment. Generally, the drying with some attendant cross-linking may be effected at temperatures of about 80 to about 130° C. and preferably about 95 to about 115° C.

Normally, however, the properties of the bonded fibrous product are greatly enhanced by a heat-cure of the copolymer to effect a complete cross-linking thereof. The heat-cure can be effected by subject ing the fibrous masses containing the copolymer/ester after the drying operation or as the final portion of the drying stage itself, to a baking or curing operation which may be effected at a temperature of about 100 to about 180° C. for periods from about 2–5 minutes at the lower temperature to as low as 1–2 minutes at the higher temperature, with the specific cure time being dependent on the weight of the treated fibers. In general, the temperature of baking and curing are controlled so that no appreciable deterioration or degradation of the fibers or copolymer occurs.

In a preferred baking and curing operation the heating period is normally shortened by adding to the copolymer compounds which accelerate the cure, as for example, acids or compounds yielding acids, such as phosphoric acid, tartaric acid, acetic acid, ammonium chloride, ammonium oxalate, ammonium nitrate, paratoluene sufonic acid, or the like. Where such accelerators are used, the curing can be effected at temperatures of about 100 to about 180° C. for a period of 1–4 minutes. Where a catalyst is used to accelerate the curing of the copolymer binder, it may be used in amounts up to about 8%, and preferably about 2 to about 4% by weight, based on the quantity of the binder employed.

The bonded fibrous products of this invention are characterized by softness, hand, flexibility, resistance to dry-cleaning solvents and resistance to laundering with conventional detergents. The softness, flexibility and strength of the fibrous products of this invention adapts them for use in garments, padding, cushioning, and the like.

Although the novel copolymers of this invention have been described as the sole binder for non-woven fibrous products, for some applications the copolymers of this invention may be employed in conjunction with thermosetting precondensate resins, such as aminoplasts, capable of cooperating with the copolymer binders to give enhanced properties of launderability and dry-cleaning resistance in the non-woven products, particularly when in the form of fabric material. The preferred aminoplast resins for blending with the copolymers of this invention are the condensation products or precondensate of urea and formaldehyde, ethylene urea and formaldehyde, and of formaldehyde and melamine, including alkylated precondensates of urea-formaldehyde and melamine-formaldehyde. Typical of these aminoplasts are the reaction products of formaldehyde with triazines, such as melamine, and the alcohol modified melamine-formaldehyde condensates which have been etherified by reaction with a lower alcohol, such as methyl and ethyl alcohols.

Where such an auxiliary aminoplast binder is employed, it may be used up to about 50% by weight, based on the weight of the copolymer binders of this invention, with about 2–15% by weight of the aminoplasts being preferably employed.

Although the foregoing has described the use of the novel copolymers in conjunction with the preparation of bonded nonwoven structures, these novel copolymers are also useful as pigment binders in coating applications and as binders of cotton linters and other grades of cotton fibers in the preparation of cotton batting for use in automotive seating and upholstery. These novel N-methylolamide polymers are also useful in the treatment of glass fiber fabrics, and as primer coatings and protective coatings for metals and metallized fabrics. For use with metallized fabrics these novel polymers may be employed as the primer and as a protective coating to give excellent protection of the fabric against attack by various salts, as for example, that of salt water. In applications with metallized fabrics, the base polymeric substrate may be first prime coated with the novel copolymers of this invention followed by deposition of vaporized metal, such as aluminum, under vacuum on the primer coating with subsequent coating of the metallized fabric with a protective coating of the copolymers of this invention.

The novel copolymers of this invention are also readily adaptable for specialty applications in coatings, moldings, and the like, by blending with thermoplastic resins, such as the vinyl or acrylic types of resins, for example, polymers and copolymers of ethylene, propylene, vinyl acetate, vinyl chloride, acrylonitrile, styrene, acrylic and methacrylic esters, and the like.

The following examples are presented to illustrate the invention, with all percentages and parts specified as percentages and parts by weight unless otherwise indicated.

Example 1

(A) An aqueous dispersion of an intermediate amide containing copolymer was obtained by the emulsion copolymerization at 85° C. and 4500 p.s.i. of ethylene with 10 parts of n-butyl acrylate and 1 part acrylamide in an aqueous medium comprised of 100 parts water, in the presence of 3 parts of sodium dodecylbenzene sulfonate (commercial "Siponate DS-10" emulsifier) and 0.35 part potassium persulfate.

The polymerization was allowed to proceed to a 19.6% total solids content in the latex. The latex was then stripped by evaporation to a 40.4% total solids content. The copolymer of the resultant emulsion contained, by weight, 42.2% ethylene, 55.0% n-butyl acrylate and 2.8% acrylamide.

(B) The above ethylene/n-butyl acrylate/acrylamide copolymer of this example was methylolated to a ethylene/n-butyl acrylate/N-methylol acrylamide copolymer by adding 40 gms. of Formalin (37% solution of formaldehyde in water) to a 500 gm. portion of the stripped latex of this example and the pH of the reaction mixture adjusted to 11.5 with 13 gms. of a 5.8% aqueous solution of sodium hydroxide. The mixture was then heated with mild agitation for one hour at 35–40° C. The resultant product emulsion was then cooled and adjusted back to a pH of 6.5 with 13.5 grams of 6.1% aqueous HCl. The product obtained was a copolymer, on a mole basis, of 76.3% ethylene, 21.7% n-butyl acrylate and 2.0% N-methylol acrylamide.

Example 2

(A) Part A of Example 1 was repeated with the exception that 0.5 part of potassium persulfate was employed in the aqueous reaction medium at 90° C. with the polymerization allowed to proceed to a 16% total solids content in the emulsion. The product obtained was a copolymer of, by weight, 32.3% ethylene, 64.2% n-butyl acrylate and 3.5% acrylamide. The emulsion was then stripped by evaporation to a total solids content of 39%.

(B) In this part of the example 40 grams of a 37% solution of formaldehyde in water was added to a 500 gram portion of the emulsion of Part A, and the mixture adjusted to a pH of 11.5 with 13 gms. of a 5.8% aqueous solution of sodium hydroxide. The mixture was then heated with stirring for about one hour at 35–40° C. The resultant emulsion was then cooled and adjusted back to a pH 6.5 with hydrochloric acid. A copolymer of, on a mole base, 67.6% ethylene, 29.5% n-butylacrylate, and 2.9% N-methylol acrylamide was obtained.

Example 3

(A) Copolymer of 47.1 wt. percent ethylene, 50.2 wt. percent n-butyl acrylate and 2.7 wt. percent methacrylamide was prepared in the form of a latex by the emulsion copolymerization of ethylene at 80° C. and 4500 p.s.i. with 10 parts of n-butyl acrylate and 1.0 parts of methacrylamide in about 100 parts of water in the presence of 0.25 part potassium persulfate and 3.0 parts of "Siponate DS–10" (a commercial sodium dodecyl benzene sulfonate), to a 19.8% total emulsion solids. After polymerization, the emulsion was stripped by evaporation to 39.8% total solids content. The amide-containing copolymer of this example was characterized by a Shore-D hardness of 3.

(B) This amide containing copolymer was methylolated with formaldehyde by adding 8 mls. of Formalin (37% aqueous solution of formaldehyde) to 100 mls. of the stripped emulsion and adjusting the pH of the mixture to 11.5 with sodium hydroxide. One batch (a) of the mixture was heated with stirring for one hour at 40–50° C., and a second batch (b) was heated and stirred for the same time at 30–35° C. Each of the batches was then cooled and its pH adjusted to 6.5 with HCl.

Example 4

Portions of each of the methylolated emulsion batches of part (B) in Example 3 were padded on separate viscose fleeces (about 60 grams per square meter) to about a net 35 dry wt. percent pick up of the N-methylolamide copolymer. The fleeces were first dried for 3 minutes at a temperature of 110° C. A portion of the fleeces impregnated with the methylolated emulsion identified as batch a and a portion of the fleeces impregnated with the methylolated emulsion identified as batch b were then cured for 3 minutes at a temperature of about 150° C. Each of the fleeces was then subjected to tests for laundering, dry cleaning and odor.

The odor tests for this example were made by immersing 2 to 3 gms. of the specimen (in finely cut-up form) in 20 mls. of a 10% $Na_2CO_3$ solution contained in a jar which was then tightly sealed. The jar and contents were then heated in an oven at 60–70° C. for 30 minutes. The jar was then removed from the oven and opened. The contents were then smelled by the operator and a subjective determination was made of any odor that may have been generated.

The copper discoloration tests that were employed were made by submerging 4 x 4 inch specimens for 10 minutes in boiling water containing 2 mls. of 2% aq. cu. $SO_4$. The specimen was then removed and dried, without rinsing, at 105–110° C. An observation of the appearance of a green color was recorded.

The chlorine discoloration tests employed were made in a solution of 0.5 gm. of "Tide" in 100 mls. of water heated to 71° C. followed by the addition of 1.0 ml. of "Clorox." A 4 x 4 inch specimen was then immersed for 20 minutes in the solution and the temperature maintained at about 80° C., with agitation of the solution and specimen. The specimen was then removed from the solution, rinsed, and an observation made as to any discoloration of the specimen by comparison to an original specimen.

The properties of the fleeces of this example after the above-described tests are set forth in Table I below:

TABLE I

| Methylolated emulsion batch | Methylolation temperature, ° C. | Treatment | Test Results | | |
|---|---|---|---|---|---|
| | | | Laundry | Dry cleaning | Odor |
| a | 40-50 | Dried only at 110° C | Satisfactory | Good | Very slight acceptable. |
| a | 40-50 | Dried at 110° C. and cured at 150° C. | Good | do | Do. |
| b | 30-35 | Dried at 110° C | Satisfactory | do | None. |
| b | 30-35 | Dried at 110° C. and cured at 150° C. | Good | do | Do. |

Example 5

Another portion of the methylolated emulsion batch *a* of Example 3 (i.e., methylolated at 30–35° C.) was used in preparing an impregnating bath comprised of the following ingredients, per 100 parts of bath:

| Component: | Parts by weight |
|---|---|
| Methylolated emulsion batch a, i.e., copolymer, on mole basis, of ethylene (79.8%)/n-butyl acrylate (18.6%)/N-methylol methacrylamide (2.6%) | 55 |
| NH$_4$Cl 25% solution in water | 2.5 |
| Water | 42.5 |
| Total | 100.0 |

A series of viscose fleece specimens (about 60 g./m.$^2$) were impregnated with binder by immersion in the impregnating bath to impart a total solids pick-up of 35.5 dry wt. percent, based on the weight of the fibers. The wet fleeces were passed through the nip of a pair of squeeze rolls, dried 3 minutes at 105–110° C., and half of the specimens then cured for 3 minutes at 150° C. All specimens (cured and uncured) were tested by standard tests for dry cleaning, laundering, tensile strength, wet and dry wrinkle recovery, copper discoloration and softness.

The average of the properties of the finished fleeces are given in Table II below:

TABLE II

| Fleece specimens heat treatment | Dry cleaning resistance AATCC 86-1957T | Laundering resistance AATCC-IV 61-1962 | Tensile strength, lbs./in. | Wrinkle recovery, percent at 180° F. Wet | Wrinkle recovery, percent at 180° F. Dry | Copper discoloration [1] | Softness [2] |
|---|---|---|---|---|---|---|---|
| Dried only | Acceptable | Acceptable | 5.5 | 85.8 | 77.5 | 3 | 1 |
| Dried and cured | Good | Good | 7.0 | 89.1 | 81.6 | 3 | 3 |

[1] Graduated numerical rating from 0 to 5, where 0 is none and 5 is very bad.
[2] Graduated numerical rating from 1 to 10, where 1 is very soft and 10 is very hard.

Example 6

(A) Part A of Example 3 was repeated with the exception that the polymerization was allowed to proceed to a total emulsion solids content of 19.2%. The product obtained was an emulsion of copolymer having 56.3 wt. percent ethylene, 40.9 wt. percent n-butyl acrylate and 2.8 wt. percent methacrylamide, with the emulsion stripped after polymerization to a total emulsion solids content of 39.8%. This copolymer had a Shore-D hardness of 3 and was insoluble in methyl ethyl ketone.

(B) Methylolation of the amide-containing copolymer of the emulsion of Part A to a dispersed copolymer of 80.0 mol percent ethylene, 18.5 mol percent n-butyl acrylate and 1.5 mol percent of N-methylol methacrylamide was effected by adding 20 grams of Formalin (a 37% aqueous solution of formaldehyde) and 30 grams of a 5.85% solution of NaOH to 250 grams of the stripped emulsion of Part A, followed by heating separate 100 gram portions of the mixture at 30–40° C. for varying periods of times, as follows:

| | Hours |
|---|---|
| Portion *a* | 1 |
| Portion *b* | 1 |
| Portion *c* | 4 |

After the methylolation, the pH of each of portions *a*, *b*, and *c* was adjusted by the addition of 30 gms. of a 5% solution of concentrated HCl.

Example 7

To 100 gm. portions of each of the methylolated emulsion portions *a*, *b* and *c* of Part B of Example 6 was added 11.1 grams of a 3% aqueous solution of NH$_4$Cl to accelerate subsequent curing of the methylolated copolymer.

The emulsion portion were then padded on separate samples of 2 oz. viscose fleece to provide a 35% solids pick-up after drying. The wet samples were then dried, with portions of the samples also cured. The conditions of drying and curing, and properties of the bonded fleeces are set forth below in Table III:

TABLE III

| | | Test Results | |
|---|---|---|---|
| | Heat treatment | Laundering resistance AATCC-IV | Dry clean resistance AATCC |
| Methylolated portion: | | | |
| a | Dried for 4 minutes at 110° C. | Excellent | Excellent. |
| b | Dried for 3 minutes at 110° C. and cured for 3 minutes at 150° C. | do | Do. |
| c | Dried for 3 minutes at 110° C., and cured for 3 minutes at 150° C. | do | Do. |

Example 8

For application of the copolymers as coatings for metallized fabrics, coating compositions were prepared and the treated fabric tested for softness, resistance to laundering, dry cleaning and salt water. The coating compositions comprised the following ingredients per 100 parts of the coating composition:

| | Component, parts by weight | |
|---|---|---|
| | A | B |
| Methylolated emulsion portion b of Part B of Example 6 | 12 | 11 |
| NH$_4$Cl, 1% aqueous solution | 2 | 2 |
| Water | 86 | 86 |
| Aminoplast, Commercial "Resin 23" methylolated triazine resin, 40% water solution | | |
| Total | 100 | 100 |

Each coating composition was coated on three different sheets of polyester chiffon, and then dried and cured as follows:

| Steps | Sheet No. 1 | Sheet No. 2 | Sheet No. 3 |
|---|---|---|---|
| (a) Prime coating | Dried for 3 min. at 110° C. | Dried for 3 min. at 110° C. | Dried for 3 min. at 110° C., and cured for additional 3 min. at 150° C. |
| (b) Metallization of sheets (aluminum, vacuum). | | | |
| (c) Top coating | Dried for 3 min. at 110° C. | Dried for 3 min. at 110° C. and cured for 3 min. at 150° C. | Dried for 3 min. at 110° C., and cured for 3 min. at 150° C. |

The salt water test was carried out by treating 4″ x 4″ samples of each sheet for 15 minutes at 160° F. in 150 mls. of a solution of 30 gms. NaCl and 5 gms. $MgCl_2$ per liter of the test liquid.

The properties of the coated metallized sheets are set forth below in Table IV.

TABLE IV

| Coating composition: | Sheet no. | Softness [1] | Salt water resistance | Dry cleaning resistance [2] | Laundering resistance [3] |
|---|---|---|---|---|---|
| A | 1 | 1 | Excellent | Good | Satisfactory. |
| A | 2 | 1 | do | do | Do. |
| A | 3 | 1 | do | do | Do. |
| B | 1 | 1 | Exceptionally good | do | Good. |
| B | 2 | 1 | do | do | Do. |
| B | 3 | 1 | do | do | Do. |

[1] Graduated numerical rating from 1 to 10 where 1 is very soft and 10 is very hard.
[2] AATCC, 86-1957T.
[3] AATCC-IVA, 61-1962.

Example 8

An amide-copolymer containing, on a mole basis, 85.3% ethylene, 13.4% n-butyl acrylate and 1.3% methacrylamide was obtained by repeating Part A of Example 6. The resultant emulsion contained 39.8% total solids.

One hundred grams of the copolymer emulsion were methylolated by adding 8 mls. of 37% Formalin at a pH of 11.5 and 40.0° C. After cooling, the pH of the product emulsion was adjusted to 6.5. The resultant emulsion of ethylene/n-butyl acrylate/N-methylolmethacryamide copolymer was used in preparing the impregnating baths comprised of the following ingredients, per 100 parts of the bath:

TABLE V

| Component | Parts by weight | |
|---|---|---|
| | Bath No. 1 | Bath No. 2 |
| N-methylolamide copolymer emulsion of this Example 8, 39.8% solids | 41 | 33 |
| Commercial aminoplast "Resin-23", methylolated triazine, 40% water solution | 3.8 | 10 |
| $NH_4Cl$, 10% water solution | 6 | 2 |
| Water | 49.2 | 55 |
| Total | 100 | 100 |
| Ratio, copolymer/aminoplast "Resin 23" | 90/10 | 73/27 |

Samples of cotton batting in the form of thin layers of waste cotton, were impregnated with Bath No. 1 to provide a 19% solids pick-up after drying and curing at 150° C. for 6 minutes. Similar samples of cotton batting were impregnated with Bath No. 2 to provide a 5.6% solids pick-up after drying and curing at 150° C. for 6 minutes.

All treated and cured cotton samples were then held at 50% compression for 22 hours at 158° F., and (after release of compression force) 30 minutes were allowed for recovery of the samples at room temperature.

The recovery of the samples bonded with Bath No. 1 was found to average 95%, and the average recovery of the samples bonded with Bath No. 2 was 99%.

Example 9

An aqueous dispersion containing 42.2% by weight of an emulsion copolymer of about, by weight, 49% ethylene, 45.5% n-butyl acrylate and 4.5% acrylamide was prepared by emulsion copolymerization at 75° C. of, by weight, 10 parts n-butyl acrylate and 1 part acrylamide and ethylene at 4500 p.s.i. per 100 parts of water containing 0.3 part potassium persulfate and 3 parts of sodium dodecyl benzene sulfonate.

The resultant emulsion product was converted with formaldehyde to the corresponding copolymer of ethylene n-butyl acrylate and N-methylol acrylamide as set forth in Table VI below:

TABLE VI

| Steps | Modified Emulsion | |
|---|---|---|
| | 9-A | 9-B |
| Base emulsion, parts by weight | 100 | 100 |
| Formalin (37% aq.), parts by weight | 14 | 14 |
| pH after adjustment with 5% NaOH solution | 11.5 | 11.5 |
| Stirring time at 40° C., min | 60 | 60 |
| Temperature after cooling, ° C | 25 | 25 |
| Type of acid used at 5% conc. to adjust pH to 6.5 | HCl | $H_2SO_4$ |

The modified emulsions were then used to prepare the binder composition set forth in Table VII below.

TABLE VII

| Component | Binder formulation Parts by Weight | | | |
|---|---|---|---|---|
| | 9a | 9b | 9c | 9d |
| Modified emulsion: | | | | |
| 9-A | 43 | 38.7 | | |
| 9-B | | | 43 | 38.7 |
| Commercial 40% solution methylolated triazine, "Resin 23" aminoplast | | 3.8 | | 3.8 |
| $NH_4Cl$ aq. 10% | 4.5 | 4.5 | 4.5 | 4.5 |
| Water | 52.5 | 53 | 52.5 | 53 |
| Total | 100 | 100 | 100 | 100 |
| Emulsion/aminoplast resin ratio | | 90/10 | | 90/10 |
| Total solids, wt. percent | 15 | 15 | 15 | 15 |

Separate series of four swatches of a 100% viscose 3 den. fleece were padded with each emulsion, and then dried and cured, in one step, for four minutes at 150° C.

All cured samples were then conditioned at 75° F. and 50° relative humidity for at least 24 hours. Samples of each formulation were also exposed to ultra-violet light in a "WeatherOmeter" for 216 hours at a relative humidity of 50%. The samples were then tested for color, loss in tensile strength and loss in elongation. The test results as an average of at least four determinations are set forth below in Table VIII.

TABLE VIII

| | Binder formulation | | | |
|---|---|---|---|---|
| | 9a | 9b | 9c | 9d |
| Binder pick-up, percent based on weight of fibers | 36.7 | 35.9 | 33.1 | 35.8 |
| Drycleaning, AATCC | Good | Good | Good | Good |
| Laundering, AATCC-IV | Good | Good | Good | Good |
| Copper Discoloration | Pass | Pass | Pass | Pass |
| Wrinkle recovery,[1] percent: | | | | |
| Dry M.D.[2] | 84.5 | 80.5 | 74.5 | 99.5 |
| Dry A.M.D.[3] | 80.4 | 82.8 | 82.3 | 81.2 |
| Wet M.D. | 92.8 | 88 | 88.6 | 85.6 |
| Wet A.M.D. | 86.7 | 88 | 91.7 | 81.7 |
| Tensile strength, lbs./in.: | | | | |
| M.D. | 6.6 | 9.3 | 7.7 | 9.8 |
| A.M.D. | 7.25 | 9.86 | 9.08 | 9.9 |
| Elongation, percent: | | | | |
| M.D. | 4.8 | 4.5 | 4.95 | 4.1 |
| A.M.D. | 3.45 | 3.45 | 3.76 | 4.05 |
| Stitch tear, lbs.: | | | | |
| M.D. | 2.03 | 2.18 | 2.07 | 2.10 |
| A.M.D. | 1.71 | 1.43 | 2.05 | 2.05 |
| Softness, after ultra-violet light exposure for 216 hrs. | Good | Satisfactory | Good | Satisfactory |
| Tensile strength loss after 216 hrs. U.V. exposure, M.D., percent | 18.3 | 29 | 32.5 | 37 |
| Elongation loss after 216 hrs. U.V. exposure, A.M.D., percent | 38 | 33 | 39 | 27 |
| Color change after 216 hrs. U.V. exposure | None | None | None | None |

[1] Monsanto Wrinkle Recovery Test.
[2] M.D., Machine Direction.
[3] A.M.D., Across Machine Direction.

Example 10

An emulsion was prepared as set forth below in Table IX:

TABLE IX

Recipe:
  Water _____ parts by weight __ 100
  Emulsifier, commercial "Siphonate DS-10" _____ parts by weight __ 3
  Potassium persulfate _____ do ____ 0.25
  n-Butyl acrylate _____ do ____ 5
  Acrylamide _____ do ____ 0.5
  Ethylene _____ p.s.i __ 4500

Conditions:
  Temperature _____ °C __ 80
  Pressure _____ p.s.i __ 4500
  Residence time _____ p.s.i __ 5

Latex properties, raw:
  Solids _____ wt. percent __ 16.4
  pH _____ 3.8

Latex properties, stripped:
  Solids _____ wt. percent __ 36.0
  pH _____ 2.9

Polymer composition, wt. percent:
  Ethylene _____ 56.7
  n-Butyl acrylate _____ 41.3
  Acrylamide _____ 2.0

Polymer hardness, Shore D _____ 18

The emulsion was methylolated as shown in Table X:

TABLE X

Emulsion 10-A _____ parts by weight __ 117
Formalin, 37% aq. soln. _____ do ____ 10
5% NaOH to pH 11.5 _____ do ____ 16.2
Temp. of stirring for 1 hour _____ °C __ 40
5% HCl to pH 6.5 _____ parts by weight __ 3.1
Total solids _____ wt. percent __ 32

The methylolated emulsion was then used to prepare binder composition set forth in Table XI below:

TABLE XI

Binder formulation

Component:
  Methylolated emulsion ____ parts by weight __ 48.6
  NH$_4$Cl, aq. 10% _____ do ____ 4.5
  Water _____ do ____ 48.7
    Total _____ do ____ 100
    Total solids _____ wt. percent 15

The binder formulation was then padded on a 2 oz./yd.$^2$ 100% viscose fleece, and all samples were then dried for 3 minutes at 100° C. Half of the samples were cured in addition for 3 minutes at 150° C. All samples were then conditioned for 24 hours at 73° F. and 50% relative humidity.

The bonded fabrics were then evaluated with the results shown in Table XII.

TABLE XII

| | Bonding process | |
|---|---|---|
| | Dried only | Dried and cured |
| Laundering resistance AATCC-IVA | Satisfactory | Satisfactory |
| Dry cleaning AATCC | Good | Good |
| Chlorine discoloration | No retention | No retention |
| Copper discoloration | Pass | Pass |
| Tensile strength, lbs./in.: | | |
| M.D. | 10 | 11.4 |
| A.M.D. | 8.4 | 9.5 |
| Elongation, percent: | | |
| M.D. | 11.7 | 9.6 |
| A.M.D. | 13.5 | 11.3 |
| Wrinkle recovery, percent [1]: | | |
| Dry M.D. | 70.6 | 64.5 |
| Dry A.M.D. | 70.8 | 72.2 |
| Wet M.D. | 90.0 | 89.4 |
| Wet A.M.D. | 87.8 | 88.6 |

[1] Monsanto Wrinkle Recovery Test.

Although the invention has been described with reference to specific materials, embodiments and details, various modifications and changes, within the scope of the invention, will be apparent to one skilled in the art and

What is claimed is:
1. A copolymer consisting essentially of
   (A) ethylene,
   (B) an N-methylol amide of an acid selected from the group consisting of acrylic acid and methacrylic acid, and
   (C) an alkyl ester of an acid selected from the group consisting of acrylic acid and methacrylic acid with the alkyl ester moiety containing from 1 to 12 carbon atoms, the alkyl ester group being a straight or branched aliphatic carbon group or hydroxy derivative thereof.

2. The copolymer of claim 1 dispersed in an aqueous medium.

3. The copolymer of claim 1 wherein said ester is n-butyl acrylate.

4. A copolymer consisting essentially of
   (A) 20 to 80 weight percent of ethylene,
   (B) 0.5 to 5 weight percent of an N-methylol amide of an acid selected from the group of acrylic acid and methacrylic acid, and
   (C) 20 to 75 weight percent of a lower alkyl ester of an acid selected from the group of acrylic and methacrylic acid with the alkyl ester moiety thereof containing from 1 to 12 carbon atoms, the alkyl ester group being a straight or branched aliphatic carbon group or hydroxy derivative thereof.

5. The copolymer of claim 4 dispersed in an aqueous medium.

6. The copolymer of claim 4 containing 40 to 60 weight percent of said ester, and wherein said ester is n-butyl acrylate.

7. The method comprising copolymerizing a reaction mixture of
   (A) ethylene,
   (B) an amide of an acid selected from the group of acrylic and methacrylic acids, and
   (C) an alkyl ester of an acid selected from the group of acrylic acid and methacrylic acid with the alkyl ester moiety thereof containing from 1 to 12 carbon atoms in an aqueous medium and in the presence of a free-radical initiator at polymerization temperatures and pressures to form a copolymer of said ethylene, said amide and said ester, the alkyl ester group of said acid being a straight or branched aliphatic carbon group or hydroxy derivative thereof; and reacting said copolymer with formaldehyde at a pH above 8.5 and at a temperature not exceeding about 45° C. whereby amide groups of said copolymer are converted to N-methylol amide groups.

8. The method comprising co-reacting the components of a reaction mixture comprised of
   (A) ethylene,
   (B) formaldehyde,
   (C) an amide of an acid selected from the group of acrylic acid and methacrylic acid, and
   (D) an alkyl ester of an acid selected from the group of acrylic acid and methacrylic acid with the alkyl ester moiety thereof containing from 1 to 12 carbon atoms at a pH greater than 8.5 in an aqueous medium and in the presence of a free-radical polymerization initiator at a temperature of 50 to 100° C. and polymerization pressures whereby a copolymer is formed of said ethylene, said ester and the N-methylol amide of an acid selected from the group of acrylic acid and methacrylic acid and wherein the alkyl ester group of said acid being a straight or branched aliphatic carbon group or hydroxy derivative thereof.

9. The method of curing and cross-linking the copolymer of claim 1 comprising heating said copolymer at a temperature sufficiently high to effect cross-linking of said copolymer.

10. The method of curing the copolymer of claim 4 comprising heating said copolymer to a temperature sufficiently high to effect cross-linking of said copolymer.

11. A curable composition comprising the components,
    (A) the copolymer of claim 1, and
    (B) an amino resin selected from the group of urea-formaldehyde resins, melamine-formaldehyde resins, alkylated urea-formaldehyde resins and alkylated melamine formaldehyde resins.

12. A curable composition comprising the components,
    (A) the copolymer of claim 4, and
    (B) an amino resin selected from the group of urea-formaldehyde resins, alkylated urea-formaldehyde resins, melamine-formaldehyde resins, and alkylated melamine formaldehyde resins.

13. The method of making a bonded non-woven article comprising consolidating a mass of randomly arrayed fibers, dispersing the copolymer of claim 1 within said mass, and heating the resultant mass at a temperature sufficiently high to effect coalescence and fusion of the said copolymer within said mass.

14. The method of claim 13 wherein the said dispersing of said copolymer in said mass is effected by contact of said mass with an aqueous dispersion of said copolymer.

15. The method of claim 13 including the step of heating the product of claim 13 to a temperature sufficiently high to heat-cure said copolymer.

16. The method of claim 15 wherein said mass is in the form of a sheet.

17. The method of making a bonded nonwoven article comprising consolidating a mass of randomly arrayed fibers, dispersing the copolymer of claim 4 within said mass, and heating the resultant mass at a temperature sufficiently high to effect coalescence and fusion of the said copolymer within said mass.

18. The method of claim 17 wherein said mass is in the form of a sheet.

19. The method of making a bonded nonwoven article comprising consolidating a mass of randomly arrayed fibers, dispersing the composition of claim 11 within said mass, and heating the resultant mass at a temperature sufficiently high to effect coalescence and fusion of the said composition within said mass.

20. The method of claim 19 wherein said mass is in the form of a sheet.

21. The method of claim 19 including the step of heating the product of claim 19 to a temperature sufficiently high to heat-cure said composition.

22. The method of making a bonded nonwoven article comprising consolidating a mass of randomly arrayed fibers, dispersing the composition of claim 12 within said mass, and heating the resultant mass at a temperature sufficiently high to effect coalescence and fusion of the said composition within said mass.

23. The method of claim 22 including the step of heating the product of claim 22 to a temperature sufficiently high to cure said composition.

24. The method of claim 22 wherein said dispersing of said composition in said mass is effected by contact of said mass with an aqueous dispersion of said composition.

25. A nonwoven fibrous product comprising a consolidated mass of randomly arrayed fibers with the fibers thereof bonded together with a binder composition comprising the copolymer of claim 1.

26. The product of claim 25 wherein said binder composition is cured.

27. A nonwoven fibrous product comprising a consolidate mass of randomly arrayed fibers with the fibers thereof bonded together with a binder composition comprising the copolymer of claim 4.

28. The product of claim 27 wherein said binder composition is cured.

29. A nonwoven fibrous product comprising a consolidated mass of randomly arrayed fibers with the fibers thereof bonded together with a binder composition comprising the composition of claim 11.

30. The product of claim 29 wherein said binder is cured.

31. A nonwoven fibrous product comprising a consolidated mass of randomly arrayed fibers with the fibers thereof bonded together with a binder composition comprising the composition of claim 12.

32. The product of claim 31 wherein said binder is cured.

33. An article having as a coating on its surface a copolymer of claim 1.

34. The article of claim 33 wherein said copolymer is cured.

35. An article having as a coating on its surface a composition of claim 11.

36. The article of claim 35 wherein said composition is cured.

References Cited

UNITED STATES PATENTS

| | | |
|---|---|---|
| 3,151,101 | 9/1964 | Vogel et al. 260—80.73 |
| 3,157,562 | 11/1964 | Kine et al. |
| 3,337,517 | 8/1967 | Anspon 260—80.73 |
| 3,345,318 | 10/1967 | Lindemann et al. |
| 3,347,811 | 10/1967 | Bissot. |

MURRAY TILLMAN, Primary Examiner

JOHN T. GOOLKASTAN, Assistant Examiner

U.S. Cl. X.R.

117—119, 140, 161; 260—29, 80, 851, 856